US010882620B2

(12) United States Patent
Ferguson et al.

(10) Patent No.: US 10,882,620 B2
(45) Date of Patent: Jan. 5, 2021

(54) ADJUSTABLE UPPER THORACIC SUPPORT FOR AIRCRAFT SEAT

(71) Applicant: AMI Industries, Inc., Colorado Springs, CO (US)

(72) Inventors: Keith M. Ferguson, Colorado Springs, CO (US); Jason Michael Sharpe, Colorado Springs, CO (US)

(73) Assignee: Raytheon Technologies Corporation, Farmington, CT (US)

( * ) Notice: Subject to any disclaimer, the term of this patent is extended or adjusted under 35 U.S.C. 154(b) by 178 days.

(21) Appl. No.: 16/029,869

(22) Filed: Jul. 9, 2018

(65) Prior Publication Data

US 2020/0010199 A1    Jan. 9, 2020

(51) Int. Cl.
*B64D 11/06*    (2006.01)

(52) U.S. Cl.
CPC .............................. *B64D 11/0642* (2014.12)

(58) Field of Classification Search
CPC ................................................ B64D 11/0642
See application file for complete search history.

(56) References Cited

U.S. PATENT DOCUMENTS

| | | | |
|---|---|---|---|
| 5,505,520 A | 4/1996 | Frusti et al. | |
| 6,530,622 B1* | 3/2003 | Ekern | B60N 2/2222 297/354.11 X |
| 7,967,379 B2 | 6/2011 | Walters et al. | |
| 9,333,882 B2 | 5/2016 | Line et al. | |
| 10,493,882 B1* | 12/2019 | Romelfanger | B60N 2/2222 |
| 2004/0017099 A1 | 1/2004 | O'Connor | |
| 2016/0096449 A1* | 4/2016 | Line | B60N 2/2222 297/354.11 X |
| 2016/0297337 A1 | 10/2016 | White et al. | |
| 2016/0302577 A1* | 10/2016 | Mullen | A47C 7/46 |
| 2018/0056834 A1 | 3/2018 | Line et al. | |
| 2018/0078812 A1* | 3/2018 | Harlow | A63B 21/1609 |
| 2018/0116406 A1 | 5/2018 | Galbreath et al. | |
| 2018/0118060 A1 | 5/2018 | Zouzal et al. | |
| 2019/0337388 A1* | 11/2019 | Helot | B60K 37/00 |

OTHER PUBLICATIONS

European Patent Office, European Search Report dated Dec. 6, 2019 in Application No. 19185239.1.

* cited by examiner

*Primary Examiner* — Anthony D Barfield
(74) *Attorney, Agent, or Firm* — Snell & Wilmer L.L.P

(57) ABSTRACT

A seat for an aircraft may comprise a seat pan and a back support coupled to the seat pan. An upper thoracic support may be located proximate an end of the back support opposite the seat pan. The upper thoracic support may be configured to rotate relative to the back support. A headrest may be coupled to the upper thoracic support.

13 Claims, 4 Drawing Sheets

ADJUSTABLE UPPER THORACIC SUPPORT FOR AIRCRAFT SEAT

FIELD

The present disclosure relates to aircraft seats, and, more specifically, to an aircraft seat having an adjustable upper thoracic support.

BACKGROUND

Aircraft seats may be used for long periods of time depending on flight duration. Traditional seats may cause pain and/or discomfort due to the non-ergonomic geometry of the seat. Furthermore, the space available for extending a seat into a more comfortable position may be minimal, as useable volumetric space on an aircraft tends to be limited, and the seats should not hinder ingress and egress for passengers in the event of an emergency.

SUMMARY

A seat for an aircraft is disclosed herein. In accordance with various embodiments, the seat may comprise a back support, an upper thoracic support pivotably coupled to the back support, and a headrest coupled to the upper thoracic support.

In various embodiments, the back support may comprise a back support rail, and the upper thoracic support may comprise a thoracic support rail pivotably coupled to the back support rail.

In various embodiments, a gear may be coupled to the thoracic support rail. A drive shaft may be rotationally coupled to the gear. An actuator may be operably coupled to the drive shaft. The actuator may be configured to drive a rotation of the drive shaft.

In various embodiments, a mounting bracket maybe coupled to the upper thoracic support and configured to support attachment of the headrest to the upper thoracic support.

In various embodiments, a support bar may be coupled to the headrest. The mounting bracket may be configured to engage the support bar. The mounting bracket and the support bar may be configured to allow the headrest to translate toward and away from the back support. In various embodiments, the headrest may be configured to rotate relative to the upper thoracic support. The mounting bracket and the support bar may be configured such that as the thoracic support rail pivots relative to the back support rail, the support bar and the thoracic support rail remain coplanar.

In various embodiments, an actuator may be operably coupled to the upper thoracic support. The actuator may be configured to translate the upper thoracic support about a pivot joint. In various embodiments, a control panel may include a controller operably coupled to the actuator.

In accordance with various embodiments, a seat for an aircraft may comprise a seat pan and a back support coupled to the seat pan. An upper thoracic support may be located proximate an upper end of the back support opposite the seat pan. The upper thoracic support may be configured to rotate relative to the back support. A headrest may be coupled to the upper thoracic support.

In various embodiments, the back support may comprise a back support rail, and the upper thoracic support may comprise a thoracic support rail pivotably coupled to the back support rail at a pivot joint located proximate the upper end of the back support.

In various embodiments, a mounting bracket may be coupled to the thoracic support rail and configured to support attachment of the headrest to the upper thoracic support. In various embodiments, the headrest may be configured to translate toward and away from the upper thoracic support. In various embodiments, the headrest may be configured to rotate relative to the upper thoracic support.

In various embodiments, a gear may be coupled to the thoracic support rail. A drive shaft may be rotationally coupled to the gear. An actuator may be operably coupled to the drive shaft. The actuator may be configured to drive a rotation of the drive shaft.

In various embodiments, an actuator may be operably coupled to the upper thoracic support. The actuator may be configured to translate the thoracic support rail about the pivot joint. In various embodiments, a control panel may include a controller operably coupled to the actuator.

An upper thoracic support for a seat for an aircraft is also disclosed herein. In accordance with various embodiments, the upper thoracic support may comprise a thoracic support rail and a cushion located over the thoracic support rail. A mounting bracket may be configured to support attachment of a head rest to the thoracic support rail. A pivot joint may be located at an end of the thoracic support rail. The pivot joint may be configured to allow the thoracic support rail to rotate relative to a static structure.

In various embodiments, the static structure may comprise a back support of the seat. In various embodiments, an actuator may be operably coupled to the thoracic support rail and configured to translate the thoracic support rail about the pivot joint. In various embodiments, a gear may be coupled to the thoracic support rail at the pivot joint.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity. As used herein, "distal" refers to the direction outward, or generally, away from a reference component. As used herein, "proximal" and/or "proximate" refers to a direction inward, or generally, towards the reference component.

Aircraft seats of the present disclosure may include an upper thoracic support configured to rotate, or pivot, relative to a back support of the seat. In this regard, an occupant of the seat may adjust the upper thoracic support to a desired position. A headrest may be configured to move with the upper thoracic support such that the occupant's head will remain aligned with his/her upper thoracic area. Adjusting the upper thoracic support may place the occupant in a more ergonomic and/or comfortable position.

Figure 1:
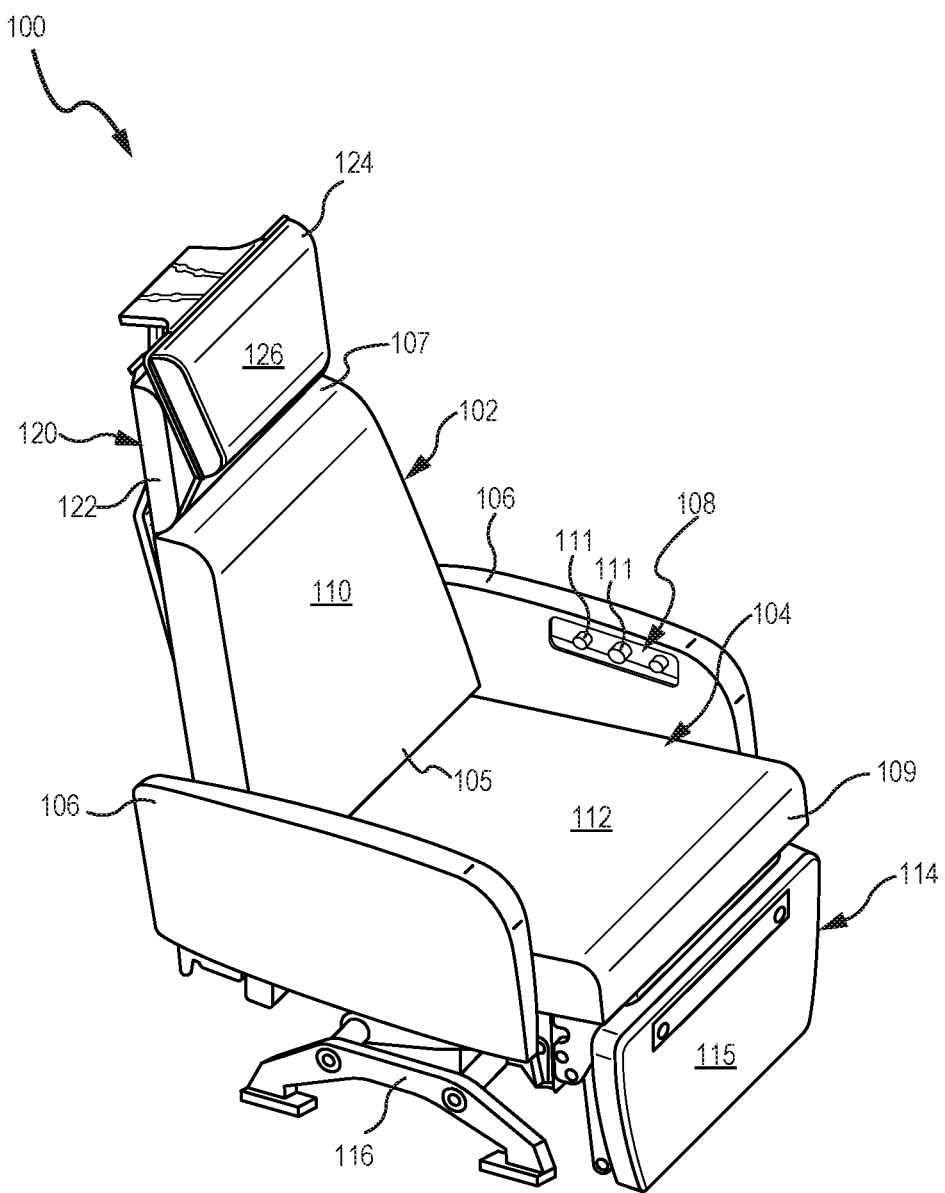
FIG. 1 illustrates a perspective view of an aircraft seat having an adjustable upper thoracic support, in accordance with various embodiments.

With reference to FIG. 1, a seat 100 for an aircraft is shown, in accordance with various embodiments. Seat 100 includes a back support 102 and a seat pan 104. Seat pan 104 may be located proximate a lower (or first) end 105 of back support 102. A set of armrests 106 may be located on opposing sides of seat pan 104. Back support 102 may include a cushion 110. Seat pan 104 may include a cushion 112. Back support 102 may be configured to recline, such that an angle of back support 102, relative to seat pan 104, increases. In various embodiments, translation and positioning of back support 102 may be electromechanically controlled. For example, in various embodiments, armrests 106 may include a control panel 108 having one or more button(s), switch(es), knob(s), or other controllers 111 in operable communication with an actuator configured to translate back support 102. In this regard, an occupant of seat 100 may use controllers 111 to adjust the positioning of back support 102 (e.g., the angle of back support 102 relative to seat pan 104). In various embodiments, actuation of back support 102 may be mechanically, or manually, controlled, such that the angle of back support 102 relative to seat pan 104 may be adjusted by, for example, an occupant of seat 100 pulling a lever and/or manually applying a force to back support 102.

A footrest 114 may be pivotably coupled to seat pan 104. Footrest 114 may include a cushion 115. Footrest 114 may be configured to rotate, or pivot, relative to an end 109 of seat pan 104. End 109 of seat pan 104 may be generally opposite back support 102. Footrest 114 may be deployed to provide lower leg and foot support to an occupant of seat 100. In various embodiments, translation and positioning of footrest 114 may be electromechanically controlled. For example, a controller 111 on control panel 108 may be in operable communication with an actuator configured to translate footrest 114. In various embodiments, actuation of footrest 114 may be controlled by a lever or any other mechanical means. Seat 100 may include a base 116. Base 116 may be configured to support seat 100 and secure seat 100 to the floor of an aircraft or other vehicle.

In accordance with various embodiments, seat 100 may include an upper thoracic support 120. Upper thoracic support 120 may include a cushion 122. Upper thoracic support 120 may be located proximate an upper (or second) end 107 of back support 102. Upper end 107 of back support 102 is generally opposite lower end 105. Stated differently, upper thoracic support 120 may be located proximate an end of back support 102 that is generally opposite seat pan 104. As discussed in further detail below, upper thoracic support 120 may be configured to rotate, or pivot, relative to back support 102.

In various embodiments, translation and positioning of upper thoracic support 120 may be electromechanically controlled. For example, in various embodiments, a controller 111 on control panel 108 may be in operable communication with an actuator configured to translate upper thoracic support 120. In this regard, an occupant of seat 100 may use controller(s) 111 to adjust the position of upper thoracic support 120 (e.g., the angle of upper thoracic support 120 relative to back support 102). In various embodiments, actuation of upper thoracic support 120 may be mechanically, or manually, controlled, such that the angle of upper thoracic support 120, relative to back support 102, may be adjusted by, for example, an occupant of seat 100 pulling a lever and/or manually applying a force to upper thoracic support 120.

A headrest 124 may be coupled to upper thoracic support 120. In various embodiments, headrest 124 may rotate, or pivot, with upper thoracic support 120, such that changing the angle of upper thoracic support 120, relative to back support 102, also changes the angle of headrest 124 relative to back support 102. Headrest 124 may also be configured to rotate, or pivot, relative to upper thoracic support 120. Headrest 124 may include a cushion 126. As discussed in further detail below, headrest 124 may be extendable. In this regard, headrest 124 may be configured to translate away from end 107 of back support 102. Translation of headrest 124, relative to end 107, and/or rotation of headrest 124, relative to upper thoracic support 120, may be controlled electromechanically or manually.

Figure 2:
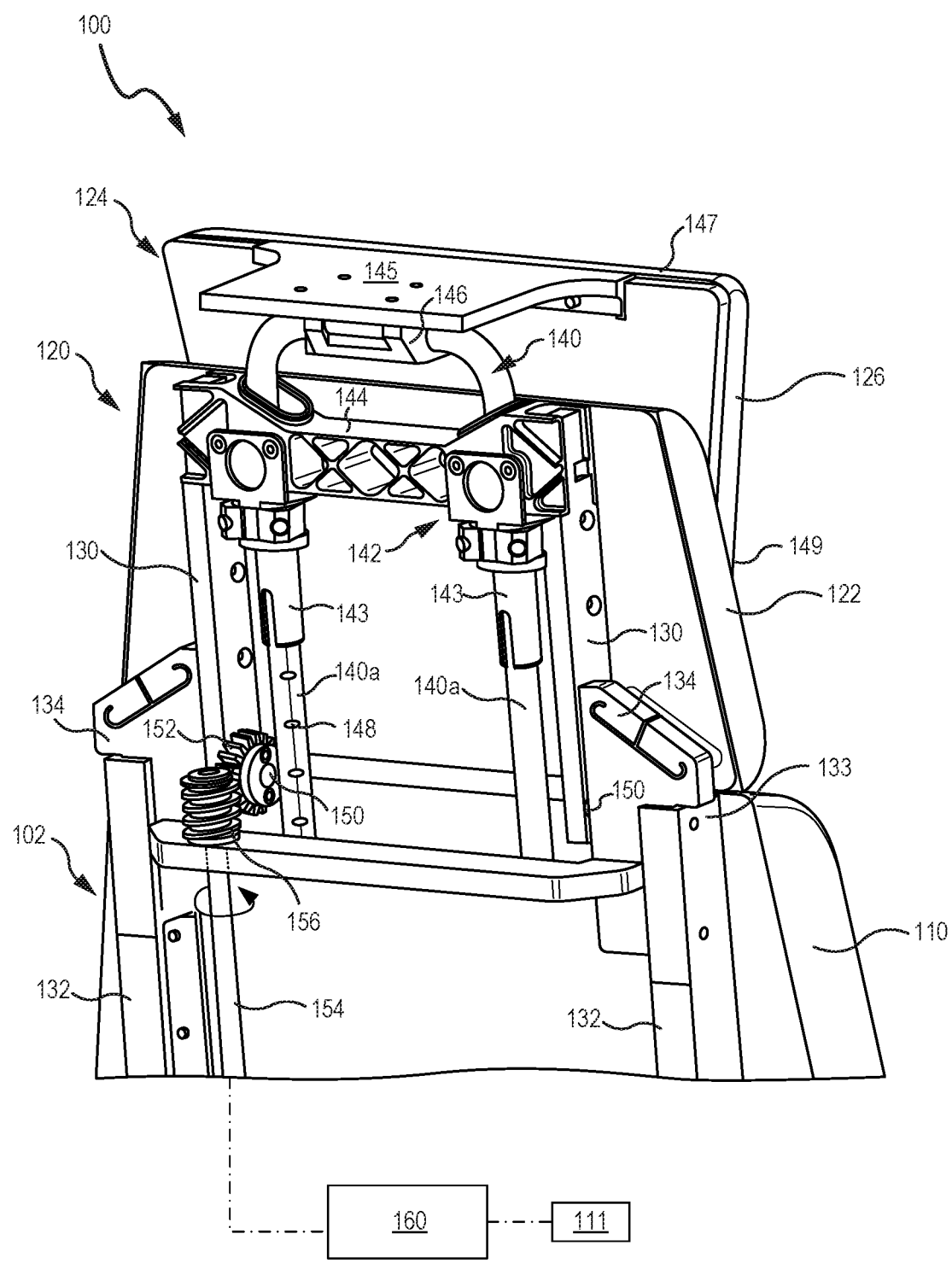
FIG. 2 illustrates a perspective view of the back of an adjustable upper thoracic support of an aircraft seat, in accordance with various embodiments.

With reference to FIG. 2, a backside of upper thoracic support 120 of seat 100 is illustrated, in accordance with various embodiments. In various embodiments, upper thoracic support 120 includes thoracic support rails 130. Thoracic support rails 130 may be employed to secure upper thoracic support 120 to back support 102. In various embodiments, thoracic support rails 130 may be coupled to back support rails 132 of back support 102 via pivot joints 150. In various embodiments, seat belt guides 134 may be located proximate an upper end 133 of back support rails 132, and thoracic support rails 130 may be coupled to seat belt guides 134. In various embodiments, thoracic support rails 130 may be coupled directly to back support rails 132. Pivot joints 150 are configured to allow thoracic support rails 130 to rotate relative to a static structure, for example, relative to back support rails 132. Stated differently, upper thoracic support 120 may rotate, relative to back support 102, at pivot joints 150.

In various embodiments, an actuator 160 may be operably coupled to thoracic support rail 130 of upper thoracic support 120. In various embodiments, actuator 160 may be operably coupled to a controller 111. Actuator 160 may be disposed at any desired location along seat 100, for example, with momentary reference to FIG. 1, under cushion 112, behind cushion 110, within armrest 106, on base 116, etc.

Actuator 160 is configured to rotate thoracic support rails 130 about pivot joints 150. For example, in various embodiments, actuator 160 may drive a rotation of a drive shaft 154 operably coupled to thoracic support rail 130. In various embodiments, a worm gear 156 may be located at an end of drive shaft 154, proximate to pivot joint 150. Worm gear 156 may engage (e.g., be meshed with) a gear 152. Gear 152 may be coupled to thoracic support rail 130 at pivot joint 150. In this regard, translation (i.e., rotation) of gear 152 causes thoracic support rails 130 to rotate about pivot joint 150. Stated differently, translation (i.e., rotation) of gear 152 causes upper thoracic support to rotate relative to back support 102. While actuator 160 is illustrated as driving a worm gear, it is further contemplated and understood that other means of electromechanically powered actuation may be employed to translate thoracic support rails 130 about pivot joint 150 and position/rotate upper thoracic support 120 relative to back support 102. In this regard, actuator 160 may drive any mechanism capable of translating thoracic support rails 130 about pivot joint 150 and/or rotating upper thoracic support 120 relative to back support 102. For example, actuator 160 may drive a push-pull rod with bell crank, a synchronous belt around a pulley, a chain and sprocket, etc., Additionally, while electromechanically powered actuation is illustrated, it is further contemplated and understood that manual means of actuation, for example, a friction interface or a pushbutton lock configured to translate and hold upper thoracic support at various incremental positions, may be employed to translate thoracic support rails 130 about pivot joint 150 and rotate upper thoracic support 120 relative to back support 102.

With continued reference to FIG. 2, upper thoracic support 120 may further include a mounting bracket 142 configured to support attachment of headrest 124 to upper thoracic support 120. In various embodiments, mounting bracket 142 may be coupled to thoracic support rails 130. In various embodiments, mounting bracket 142 may include a crossbar section 144 extending between thoracic support rails 130. Crossbar section 144 may be configured to couple thoracic support rails 130 to one another, such that a rotation of one thoracic support rail 130 about its respective pivot joint 150 is translated to the other thoracic support rail 130, thereby causing the other thoracic support rail 130 to rotate about its pivot joint 150. Mounting bracket 142 may be configured to receive a support bar 140 of headrest 124. Support bar 140 is attached to mounting bracket 142, such that support bar 140 will move with thoracic support rails 130 (i.e., headrest 124 will rotate, relative to back support 102, with upper thoracic support 120), thereby allowing the head of the seat's occupant to remain aligned with the occupant's upper thoracic area. Stated differently, support bar 140 is configured to remain coplanar with thoracic support rails 130.

Support bar 140 may be coupled to a platform 145 of headrest 124 via a pivot joint 146. Platform 145 may be located proximate an upper (or first) end 147 of headrest 124. Pivot joint 146 may be configured to allow platform 145 to rotate relative to a static structure, for example, about support bar 140. Stated differently, headrest 124 may rotate, relative to upper thoracic support 120, at pivot joint 146. Rotation of headrest 124 about pivot joint 146 may cause a lower (or second) end 149 of headrest 124 to translate toward and away from upper thoracic support 120.

In various embodiments, support bar 140 may comprise a U-shaped bar, having two vertically extending legs 140a. Legs 140a may be located through receptacles 143 of mounting bracket 142. Receptacles 143 may comprise a cylindrical shape configured to complement the shape of legs 140a. Legs 140a may define a plurality of notches, or grooves, 148. Receptacles 143 may include a protrusion or pawl configured to engage notches 148 and secure headrest 124 in a desired position.

Figure 3A:
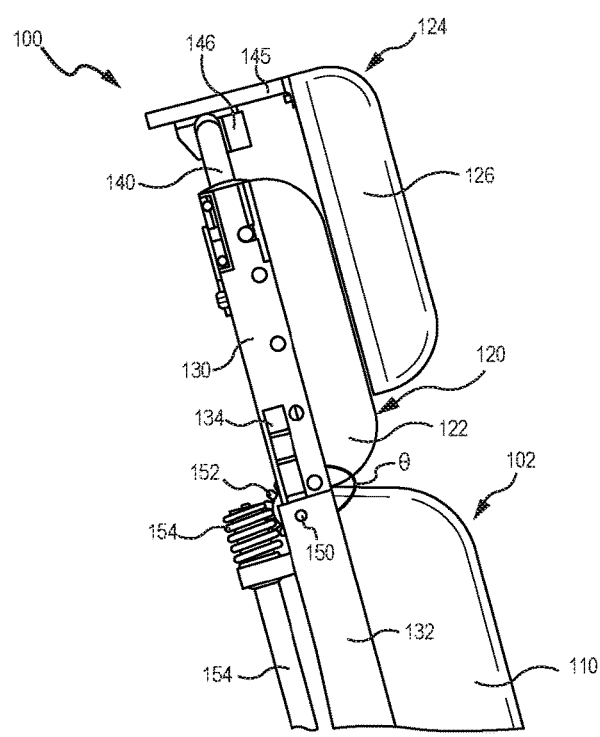
FIGS. 3A and 3B illustrate a side view of an aircraft seat having an adjustable upper thoracic support, in accordance with various embodiments.
Figure 3B:
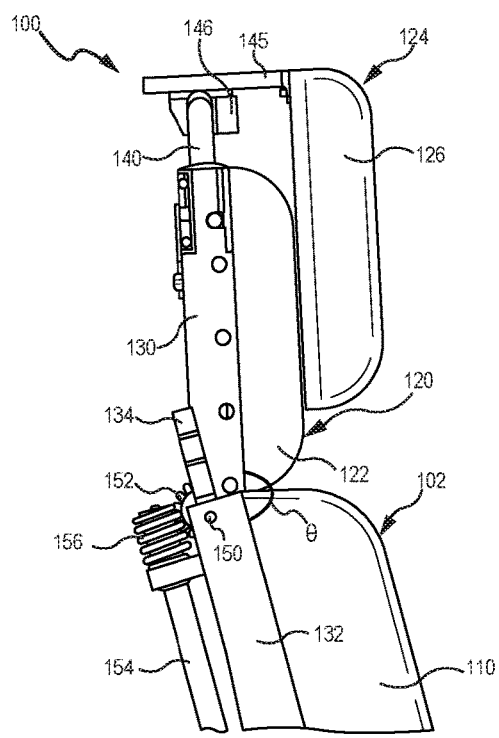

FIGS. 3A and 3B illustrate, respectively, a side view of upper thoracic support 120 of seat 100 in an aligned position and an angled position, in accordance with various embodiments. Thoracic support rail 130 of upper thoracic support 120 is coupled to back support rail 132 of back support 102 at pivot joint 150. Thoracic support rail 130 and back support rail 132 form an angle theta ($\theta$). In the aligned position of FIG. 3A, angle $\theta$ may be approximately 180°. As used in the present context only, "approximately" means±3°. Stated differently, in the aligned position, thoracic support rail 130 and back support rail 132 may be coplanar and/or parallel.

In response to rotation of drive shaft 154 and gear 152, thoracic support rail 130 rotates about pivot joint 150 and angle $\theta$ begins to decrease. In this regard, in the angled position of FIG. 3B, angle $\theta$ is less than 180°. Stated differently, in the angled position, thoracic support rail 130 and back support rail 132 may be non-parallel.

Figure 4A:
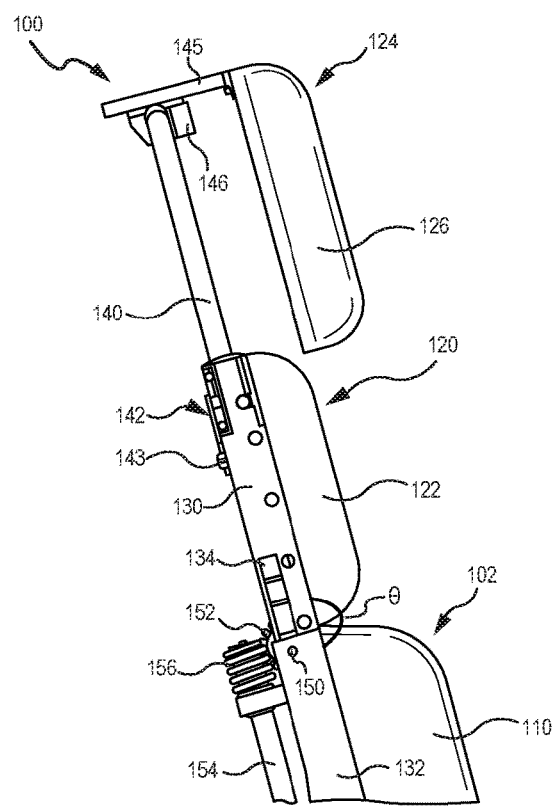
FIGS. 4A and 4B illustrate a side view of an aircraft seat having an adjustable upper thoracic support with a head rest of the aircraft seat in an extending position, in accordance with various embodiments.
Figure 4B:
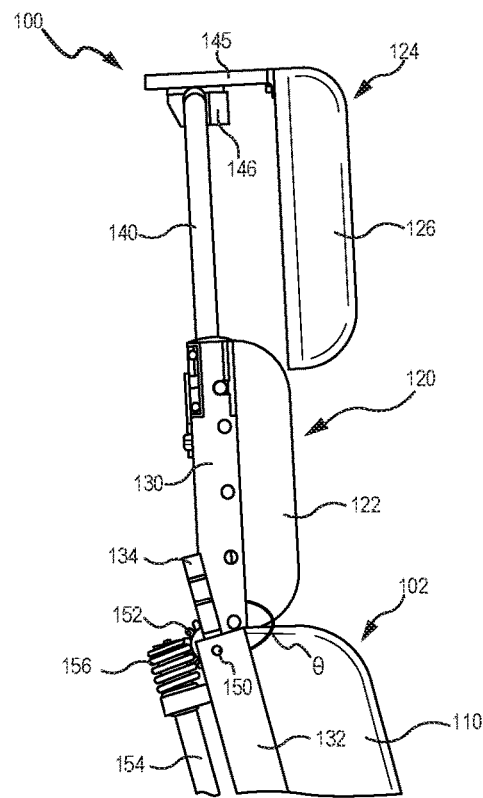

FIGS. 4A and 4B illustrate, respectively, a side view of upper thoracic support 120 in an aligned position and an angled position with headrest 124 extended, in accordance with various embodiments. In various embodiments, support bar 140 of headrest 124 may be configured to translate through receptacles 143 of mounting bracket 142. In this regard, headrest 124 may translate toward and away from back support 102.

Mounting bracket 142 is configured to align support bar 140 and thoracic support rails 130 of upper thoracic support 120, such that support bar 140 is also oriented at angle $\theta$ relative to back support rail 132. In this regard, headrest 124 will rotate with upper thoracic support about pivot joint 150. In various embodiments, support bar 140 and thoracic support rail 130 may be coplanar and/or parallel.

Adjusting angle $\theta$ and/or extending headrest 124 allows the occupant of seat 100 to position upper thoracic support 120 and headrest 124 in a more ergonomic position and with specificity to the particular comfort needs of each occupant. For example, the angled position of FIGS. 3B and 4B, allows an occupant of seat 100 to have back support 102 in a reclined position, taking pressure off the lower spine and buttocks, while supporting the occupant's upper thoracic area and head in a forward looking position (e.g., allowing the occupant to watch a screen located in front of the occupant).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seat for an aircraft, comprising:
   a back support comprising a back support rail;
   an upper thoracic support comprising a thoracic support rail pivotably coupled to the back support rail;
   a headrest coupled to the upper thoracic support;
   a gear coupled to the thoracic support rail;
   a drive shaft rotationally coupled to the gear; and
   an actuator operably coupled to the drive shaft, wherein the actuator is configured to drive a rotation of the drive shaft.

2. The seat of claim 1, further comprising a mounting bracket coupled to the upper thoracic support and configured to support attachment of the headrest to the upper thoracic support.

3. The seat of claim 2, further comprising a support bar coupled to the headrest, wherein the mounting bracket is configured to engage the support bar, and wherein the mounting bracket and the support bar are configured to allow the headrest to translate toward and away from the back support.

4. The seat of claim 3, wherein the headrest is configured to rotate relative to the upper thoracic support, and wherein the mounting bracket and the support bar are configured such that as the thoracic support rail pivots relative to the back support rail, the support bar and the thoracic support rail remain coplanar.

5. The seat of claim 1, further comprising a control panel including a controller operably coupled to the actuator.

6. A seat for an aircraft, comprising:
   a seat pan;
   a back support coupled to the seat pan, the back support comprising a back support rail;
   an upper thoracic support located proximate an upper end of the back support opposite the seat pan, wherein the upper thoracic support is configured to rotate relative to the back support, the upper thoracic support comprising a thoracic support rail pivotably coupled to the back support rail at a pivot joint located proximate the upper end of the back support;
   a headrest coupled to the upper thoracic support;
   a mounting bracket coupled to the upper thoracic support rail and configured to support attachment of the headrest to the upper thoracic support, wherein the headrest is configured to translate toward and away from the upper thoracic support, and wherein the headrest is configured to rotate relative to the upper thoracic support.

7. The seat of claim 6, further comprising:
   a gear coupled to the thoracic support rail;
   a drive shaft rotationally coupled to the gear; and
   an actuator operably coupled to the drive shaft, wherein the actuator is configured to drive a rotation of the drive shaft.

8. The seat of claim 6, further comprising an actuator operably coupled to the upper thoracic support, wherein the actuator is configured to translate the thoracic support rail about the pivot joint.

9. The seat of claim 8, further comprising a control panel including a controller operably coupled to the actuator.

10. An upper thoracic support for a seat for an aircraft, comprising:
    a thoracic support rail;
    a cushion located over the thoracic support rail;
    a mounting bracket coupled to the thoracic support rail;
    a pivot joint located at an end of the thoracic support rail, wherein the pivot joint is configured to allow the thoracic support rail to rotate relative to a static structure;
    a support bar coupled to the mounting bracket such that the support bar rotates relative to the static structure with the thoracic support rail; and
    a platform pivotably coupled to the support bar and configured to support attachment of a head rest to the support bar, wherein the support bar is configured to translate the platform toward and away from the thoracic support rail.

11. The upper thoracic support of claim 10, wherein the static structure comprises a back support of the seat.

12. The upper thoracic support of claim 10, further comprising:
    a gear coupled to the thoracic support rail;
    a drive shaft rotationally coupled to the gear; and
    an actuator operably coupled to the drive shaft, wherein the actuator is configured to drive a rotation of the drive shaft and translate the thoracic support rail about the pivot joint.

13. The upper thoracic support of claim 12, further comprising a control panel including a controller operably coupled to the actuator.

\* \* \* \* \*